June 5, 1934.  W. S. PAJES  1,961,706
ELECTROOPTICAL SYSTEM
Filed Dec. 13, 1930
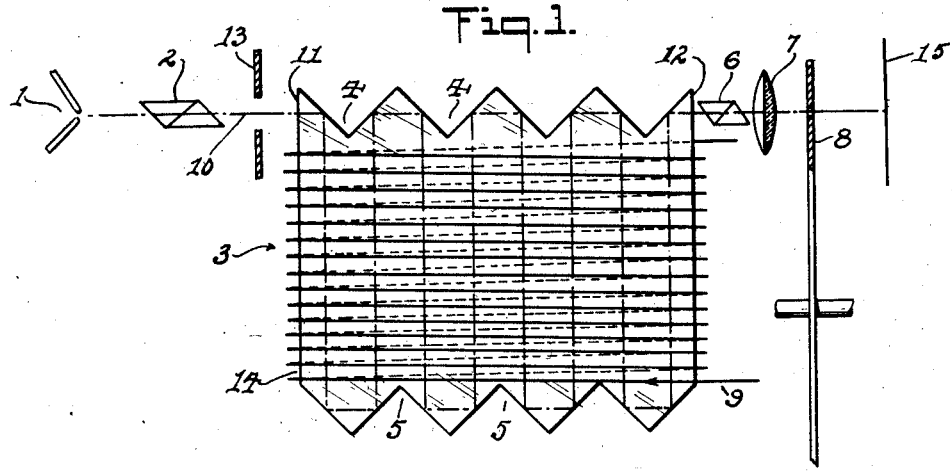
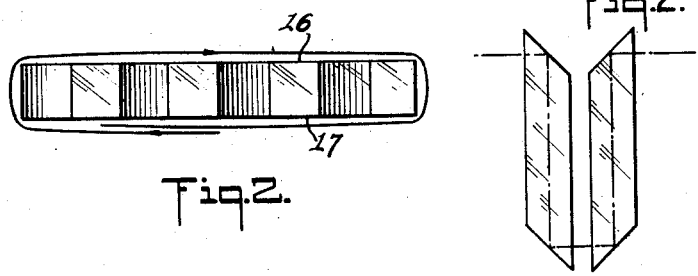
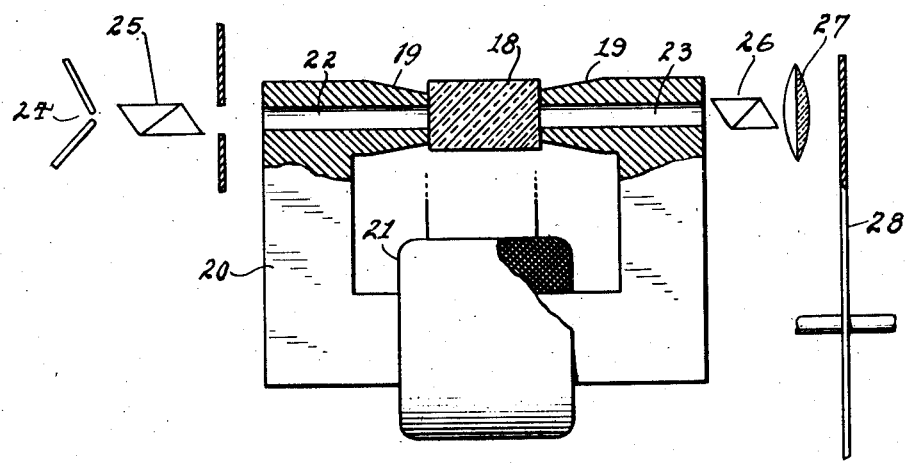
WOLF S. PAJES
INVENTOR
BY Darby&Darby
ATTORNEYS Patented June 5, 1934

1,961,706

UNITED STATES PATENT OFFICE 1,961,706

ELECTROOPTICAL SYSTEM

Wolf S. Pajes, New York, N. Y., assignor, by mesne assignments, to Radio Corporation of America, a corporation of Delaware Application December 13, 1930, Serial No. 502,078

4 Claims. (Cl. 88—61)

This invention relates to electro-optical systems, and with particularity to methods and means for controlling light.

An object of the invention is to provide an improved method for translating electric currents or potential variations into corresponding light variations.

Another object of the invention is to provide an improved type of light valve for electro-optical systems generally.

A further object is to provide a novel combination of apparatus suitable for use in television, picture transmission or facsimile systems, whereby picture or image currents may be efficiently translated into corresponding image points.

A feature of the invention relates to a novel form of apparatus for achieving rotation of the plane of polarization of light waves.

Another feature of the invention relates to the novel structure of light valve of the light polarizing type.

Another feature of the invention relates to a light valve employing a solid glass member together with means acting upon said member to vary the plane of polarization of light waves in accordance with received currents.

A still further feature relates to the novel organization and arrangement of elements which go to make up an efficient, economical and simple light valve.

Other features and advantages not specifically enumerated will be apparent after a consideration of the following detail descriptions and the appended claims.

Referring to the drawing—

Fig. 1 is a plan view in schematic form showing one preferred manner of employing the light valve according to the invention;

Fig. 2 is an end view of the light valve of Fig. 1;

Fig. 2A shows a modification of the polarization rotator of Fig. 1;

Fig. 3 is a modified form of light valve embodying features of the invention.

Referring more particularly to Fig. 1 the numeral 1 represents a source of light which is preferably of high intensity. This light source may be pan-chromatic or monochromatic as desired. For the purpose of illustration, however, it will be assumed that the light source 1 is in the form of an arc lamp, the beam from which is represented by the dot dash lines of Fig. 1. The light from lamp 1 passes through a device 2, such as a Nicol prism or the like, for the purpose of polarizing the light from the source 1. Positioned in the path of the polarized beam is a member designated generally by the numeral 3, which is in the form of a plate or block of glass, such as flint glass having one edge provided with notches 4, and the opposite edges also provided with notches 5. The notches 5 are staggered with respect to the notches 4, as illustrated in the drawing; preferably each notch is cut to provide a pair of V-shaped faces at right angles to each other, and each face of the V being preferably at an angle of 45° with respect to the longitudinal axis of the member 3. Positioned in optical alignment with the polarizing device 2 is an analyzing prism 6. The light which passes through the member 3 and the analyzer 6 may be projected by means of a suitable lens system represented schematically by the numeral 7, upon a scanning or integrating device 8, such as is well known in the picture transmission or television arts. It will be understood of course that while a perforated disc 8 is illustrated in the drawing, other forms of scanning mechanisms may be employed. The member 3 is provided with a winding 9 which is connected to a source of varying currents which are to be translated into corresponding light variations. For example, this winding may be connected to a source of image currents or picture currents such as disclosed in Patent 1,693,508, although it will be understood that any other well known source of image currents may be employed.

It has been found that when the member 3 is made of ordinary glass, or preferably flint glass, that the excitation of the winding 9 rotates the plane of polarization of the light which passes through the member 2. This angle of rotation is proportional to the intensity of the field produced by the winding 9 and also to the length of the path traversed by the beam in passing through the member 3, in accordance with the following equation $$\theta = H.L.K$$

where H is the magnetic field intensity, L is the effective length of the polarized beam, and K is Verdet's constant. It is for this reason therefore that the member 3 is notched as shown in Fig. 1, so that the polarized light beam 10 is reflected a multiple number of times from one side to the other of the member 3, as indicated by the dot dash lines in Fig. 1. This arrangement therefore increases the effective path of the polarized beam a very great number of times as compared with a direct ray that would ordinarily pass between the members 2 and 6, thus increasing the sensitivity and control of the member 3 over the polarized light beam. In accordance with the equation given above the degree of rotation effected by the winding 9 of the member 3 is therefore proportional to the length of the beam between its entrance point 11 and its emergence point 12.

If desired, a suitable mask or apertured member 13 may be provided in the path of the polarized beam to restrict the illumination of the member 3 to a localized area on the face 14 of member 3. It will also be understood that if desired a suitable lens system may be provided for focusing the polarized beam upon the said restricted area. It has been found that with currents of the magnitude ordinarily employed in television and picture transmission systems that a greater quantity of light may be controlled as compared with the prior art light valves, thus enabling the incoming television or picture currents to be projected upon a suitable screen schematically represented by the numeral 15. Obviously therefore since the control of the members 3 is directly proportional to the length of the polarized beam, a light source 1 is capable of being employed to produce the desired intensity of illumination of screen 15, which light source may be of lower intensity than that required when prior art light valves are employed for producing corresponding intensities of illumination.

It will be understood of course that while the light valve is shown in the drawing as applied to a television system it is capable of use generally in electro-optical systems such as sound recording systems or the like in which case the winding 9 will be energized by a source of sound currents and the analyzed polarized light will be projected or focused through a suitable recording aperture upon a sensitized film, as is well known in the sound recording art.

It will be understood that the inventive concept is directed broadly to the idea of increasing the effective length of the polarized beam, and therefore the showing in Fig. 1 is intended to be merely representative. Thus instead of employing a single flint glass member, a series of separate similar shaped members such as shown in Fig. 2A may be employed, said member being suitably mounted and positioned within an energizing winding (not shown) similar to the winding 9 of Fig. 1.

In using the apparatus of Fig. 1, it will be understood of course that the members 2 and 6 may be adjusted to give any initial or normal illumination of the screen 15. For example, the member 6 may be positioned about its horizontal axis so that the light is completely extinguished when the coil 9 is energized, or any intermediate position of the member 6 may be chosen to provide the necessary normal illumination of the screen 15.

Referring to Fig. 3 there is shown a form of light valve which is highly efficient in operation and extremely economical of construction. It has been found that an ordinary block of glass, such as flint glass when subjected to an electromagnetic field is capable of rotating the plane of polarization of light to a sufficient extent to enable the light to be controlled by currents such as ordinarily employed in television, picture transmission, sound recording and similar systems. In Fig. 3 this block of glass is represented by the numeral 18 and is positioned between the poles 19 of an electro-magnet 20. Magnet 20 is provided with a suitable winding 21 which is connected to the source of currents to be translated into corresponding light variations. The pole pieces 19 of the electro-magnet are provided with aligned bores 22 and 23 through which the light to be controlled passes. This light may be derived from a high intensity source 24 which passes through a polarizing prism 25 and thence through the bore 22 to the rotator 18. The light after being rotated by the device 18 passes through the bore 23 and thence through the analyzer prism 26 whence it is collected by the optical system 27 and projected upon the scanning field of the device 28. It has been found that the particular method shown in Fig. 3 for subjecting the member 18 to electro-magnetic field produces a greater change in light for a given current strength than is possible with the ordinary electro-magnetic winding. Furthermore, the use of ordinary or flint glass 18 together with the magnet shown enables a highly efficient and cheap light valve to be constructed, eliminating the use of liquids for rotating the plane of polarization, such as nitro-benzol etc., and obviating the employment of excessive voltages such as are required with liquid rotators.

While in the foregoing description the multiple prism member of Fig. 1 and the member 18 of Fig. 2 have been described as made of ordinary flint glass, it has been found that crystalline copper oxide or copper oxide in crystalline form has the property of rotating the plane of polarized light under the influence of a magnetic field, about fourteen times as much as does flint glass under the same physical conditions. Therefore, it is preferred to make the members 3 and 18 out of Ziqueline or a similar material.

While in the foregoing the invention has been described in connection with picture transmission or television systems, it will be understood that the invention is capable of use in sound recording and similar systems wherein electric current variations are to be translated into corresponding light variations.

What is claimed is:

1. In a light controlling system a light polarizer, a light analyzer, means for passing a light ray through said polarizer and thence through said analyzer, a multiple reflecting prism of crystalline copper oxide between said polarizer and said analyzer, said prism having its opposite edges provided with staggered V-shaped notches adapted to act as internal total reflecting surfaces, said notches being so disposed that when light is internally totally reflected from a face on one notch it is serially internally reflected to all the reflecting faces of the succeeding notches, and means for subjecting said prism to an electro-magnetic field.

2. Means for rotating the plane of polarization of a polarized light beam comprising a block of light conducting material, said block having its opposite edges provided with V-shaped notches, the notches on one edge being staggered with relation to the notches on the other edge, the angles of the notches being such as to provide total reflecting surfaces for light passing through said block, and means for subjecting said block to an electromagnetic field.

3. Means for rotating the plane of polarization of a polarized light beam comprising a block of light transparent material having its opposite edges thereof provided with V-shaped notches, the notches on one face being staggered with relation to the notches on the other face, and the angles of the notches being such that a light beam incident thereon is totally reflected in a zig-zag manner through the said block, and means for subjecting said block to an electromagnetic field.

4. Means for rotating the plane of polarization of a polarized light beam comprising a body of flint glass having its opposite edges thereof provided with V-shaped notches, the notches on one face being staggered with relation to the notches on the other face, and the angles of the notches being such that a light beam incident thereon is totally reflected in a zig-zag manner through said body of flint glass, and means for subjecting said body to an electromagnetic field.

WOLF S. PAJES.